United States Patent
O'Brien et al.

(10) Patent No.: US 8,061,388 B1
(45) Date of Patent: Nov. 22, 2011

(54) CHEMICAL BARRIER PLUG ASSEMBLY AND MANUFACTURING AND DISLODGEMENT METHODS FOR HYDROSTATIC AND PNEUMATIC TESTING

(76) Inventors: Daniel Edward O'Brien, Pompano Beach, FL (US); James Stanley Thomas McCafferty, Pompano Beach, FL (US); Robert H Wessels, Fort Lauderdale, FL (US); Horst Moller, Pompano Beach, FL (US)

(*) Notice: Subject to any disclaimer, the term of this patent is extended or adjusted under 35 U.S.C. 154(b) by 621 days.

(21) Appl. No.: 11/895,128

(22) Filed: Aug. 23, 2007

Related U.S. Application Data

(63) Continuation-in-part of application No. 10/983,309, filed on Nov. 8, 2004, now abandoned.

(51) Int. Cl.
*F16L 55/10* (2006.01)
(52) U.S. Cl. .............. 138/89; 138/90; 166/292
(58) Field of Classification Search .......... 138/89, 138/90; 166/292
See application file for complete search history.

(56) References Cited

U.S. PATENT DOCUMENTS

| | | | | |
|---|---|---|---|---|
| 1,549,168 A | * | 8/1925 | Townsend | 277/331 |
| 1,710,439 A | * | 4/1929 | Taylor | 138/90 |
| 4,342,336 A | * | 8/1982 | Satterthwaite et al. | 138/90 |
| 4,506,706 A | * | 3/1985 | Sandmann | 138/93 |
| 5,479,986 A | * | 1/1996 | Gano et al. | 166/292 |
| 5,685,372 A | * | 11/1997 | Gano | 166/292 |

* cited by examiner

*Primary Examiner* — Patrick F Brinson
(74) *Attorney, Agent, or Firm* — Oltman, Flynn & Kubler

(57) ABSTRACT

A barrier plug assembly for incorporation into a lower portion of a plumbing installation for supporting a column of test water during inspection of the installation includes a tubular plumbing segment for sealingly securing between and in fluid communication with opposing and spaced apart portions of a plumbing installation, the tubular plumbing segment being formed of plumbing segment material and having a plumbing segment interior and a substantially smooth and continuous plumbing segment interior surface; and a barrier plug having a plug upper surface and a plug lower surface, and having a plug circumferential surface adhering to the plumbing segment interior surface and extending diametrically across and sealing the plumbing segment interior until dislodged by a plug dislodgement triggering means; so that upon plug dislodgement the test water drains and the plumbing installation is operational.

3 Claims, 2 Drawing Sheets

CHEMICAL BARRIER PLUG ASSEMBLY AND MANUFACTURING AND DISLODGEMENT METHODS FOR HYDROSTATIC AND PNEUMATIC TESTING

FILING HISTORY

This application is a continuation-in-part of application Ser. No. 10/983,309 filed on Nov. 8, 2004 now abandoned.

BACKGROUND OF THE INVENTION

1. Field of the Invention

The present invention relates generally to the field of plumbing installations, especially during building construction. More specifically the present invention relates to a barrier plug assembly for incorporation into a lower portion of a new plumbing installation such as in a building under construction, for supporting a column of test water or to retain air or inert gas for inspection. Air or inert gas are sometimes required to find leaks prior to water testing, and to perform such a test the top of the plumbing installation is physically capped with an air fitting or a CBP is placed on top and an air fitting is added to the installation. The barrier plug assembly includes a tubular plumbing segment having a smooth and continuous plumbing segment interior surface and a barrier plug adhering to the interior surface and extending diametrically across and sealing the plumbing segment interior, the barrier plug having a plug upper surface and a plug lower surface, and having a plug circumferential surface adhering to the plumbing segment interior surface and being formed of dehydrated material which absorbs water and weakens when a test column of water is introduced onto the plug upper surface. Once this weakening occurs, the plug can no longer support the weight of the column of test water and therefore breaks and collapses so that the plumbing installation is opened for operation. The plug fragments dissolve and drain out of the installation with the water. The tubular plumbing segment preferably is either a pipe or fitting.

The plug is caused to adhere to the plumbing segment interior surface by any suitable molecular engagement means. A first such means is molecular adhesion. A second such means is creating molecular adhesion with a bonding agent or adhesive such as glue to secure the plug to the plumbing segment interior surface. A third such means is plug expansion into snug high friction contact with the plumbing segment interior surface. A fourth means is press fitting the plug into the tubular plumbing segment.

The plug material must support the column of test water for a sufficient length of time prior to collapse during which inspection can take place. This test water support duration is provided in any of several ways, including selecting plug material which dissolves at a suitable rate. A second way is to design the plug to have a maximum strength exceeding the force of the weight of the intended column of test water by a specific amount, and then after inspection adding water to the test column until the pressure reaches a designed plug failure point and the plug collapses. A third way is to form the plug of a chemical composition which is weakened or dissolved by the presence of a counteracting chemical, and then adding the counteracting chemical to test water.

2. Description of the Prior Art

There have long been barrier assemblies including barrier plugs for blocking and sealing tubular plumbing segments at the lower end of plumbing installations so that a column of test water can be retained above the barrier plug and throughout the installation for inspection. A problem with these barrier assemblies has been that they typically require a mechanical mechanism for breaking the barrier to release the test water to a drain pipe and thereby to open the plumbing installation for use. Such mechanisms add cost and reduce reliability. Another problem has been that some of the barrier assemblies include an irregularity along the interior surface of the tubular plumbing segment such as a ledge, recess or gap to support the barrier plug or a physical cap to isolate the plug, which then requires additional labor to remove, cut or break. Plumbing codes specifically forbid the inclusion of such surface irregularities, because debris can accumulate on the irregularity and gather until the pipe or fitting is clogged.

One prior barrier assembly is disclosed in Carney, et al., U.S. Pat. No. 4,607,644 issued on Aug. 26, 1986, disclosing a plumbing test plug apparatus including combined mechanical apparatus and a frangible plug requiring substantial labor and material, also leaving a gap after releasing test water. Carney requires a mechanical band to install a frangible plug. The Carney design relies on applying external mechanical pressure to break the plug, and when dislodged the missing plug leaves an internal gap at the installation location. Such a gap is forbidden by Chapter 4, entitled Prohibited Joints and Connections, at paragraph 4.7.1 and added explanatory section 706.2 of the National Plumbing Code, which does not permit the presence of gaps, recesses or ledges. The Code forbids the inclusion of gaps, ledges, or size reductions within drainage systems. In addition, the use of the Carney design is limited to installations with plumbing segments interconnected by bands. Mechanical band connections are nearly obsolete and have been replaced by solvent glue joints which now represent the greater part of the market.

Duncan, U.S. Pat. No. 6,267,001 issued on Jul. 31, 2001, teaches a test plug in the form of a combined mechanical and partially dissolvable tablet to support a column of test water. Substantial labor is required to retrieve parts following release of the test water. Duncan requires an internal ledge to house a partially dissolvable plug, but it must be placed in a fitting that has an opening in order to remove an air hose and balloon-like membrane that initially protects the plug from water contact.

Prenner, U.S. Pat. No. 3,924,677 issued on Dec. 9, 1975, reveals a device for use in the completion of an oil or gas well in the form of a water soluble plug assembly which requires welding to install and physical cutting to expose the plug. The structural strength of the plug is not relevant. Prenner requires a hole to be cut into the host pipe and a mechanical apparatus must be inserted into the pipe and welded in place. A dissolvable plug is encapsulated and is integral to the device. However a drill bit or boring equipment must be utilized inside the pipe to cut off a fixed cap to expose the plug to water.

O'Brien, et al., U.S. patent application Ser. No. 10/983,309 issued on Nov. 8, 2004 for a chemical barrier plug for hydrostatic and pneumatic testing reveals a cost effective and labor and material saving assembly which retains test water or air pressure for a sufficient period of time to be officially inspected without having to remove or actuate mechanical devices or install expensive test fittings with openings.

It is thus an object of the present invention to provide a plumbing barrier assembly including a barrier plug for incorporation into a plumbing installation to retain a column of test water for installation inspection in which the barrier assembly requires no internal gaps, ledges, size reduction or mechanical devices to hold or protect a dislodgeable barrier plug.

It is another object of the present invention to provide such a plumbing barrier assembly which requires no external or internal mechanical apparatus or removable parts to hold a dislodgeable barrier plug in a flow obstructing position or to dislodge the plug to permit test water drainage and to open the installation for use.

It is still another object of the present invention to provide such a plumbing barrier assembly which can be color coded so that in an installation where multiple barrier assemblies are needed, a particular dislodged plug can be identified.

It is yet another object of the present invention to provide such a plumbing barrier assembly which leaves no untested joints, requires no retrofitting, removal of parts, replacing threaded plugs or tightening of joints after inspection.

It is finally an object of the present invention to provide such a plumbing barrier assembly which is reliable and inexpensive to manufacture.

SUMMARY OF THE INVENTION

The present invention accomplishes the above-stated objectives, as well as others, as may be determined by a fair reading and interpretation of the entire specification.

A barrier plug assembly is provided for incorporation into a lower portion of a plumbing installation for supporting a column of test water during inspection of the installation, the barrier plug assembly including a tubular plumbing segment for sealingly securing between and in fluid communication with opposing and spaced apart portions of a plumbing installation, the tubular plumbing segment being formed of plumbing segment material and having a plumbing segment interior and a substantially smooth and continuous plumbing segment interior surface; and a barrier plug having a plug upper surface and a plug lower surface, and having a plug circumferential surface adhering to the plumbing segment interior surface and extending diametrically across and sealing the plumbing segment interior until dislodged by a plug dislodgement triggering means; so that upon plug dislodgement the test water drains and the plumbing installation is opened for operation.

The tubular plumbing segment preferably is one of a pipe and a fitting. The barrier plug optionally is caused to adhere to the plumbing segment interior surface by a molecular engagement means. The molecular engagement means optionally is adhesion of the plug material to the plumbing segment material through compression of the plug circumferential surface against the tubular plumbing segment interior surface. The molecular engagement means optionally is adhesion of an adhesive material to the plug material and to the plumbing segment material.

The dislodgement triggering means preferably is one of: plug material which progressively weakens when a test column of water is introduced onto the plug upper surface until the plug weakens until the plug can no longer support the weight of a column of test water and therefore dislodges from the plumbing segment interior surface; plug expansion into snug high friction contact with the plumbing segment interior surface. The molecular adhesion optionally is created with an adhesive to secure the plug to the plumbing segment interior surface. The adhesive preferably includes natural collagen, sugars and casein configurations. The plug material preferably includes non-toxic, biodegradable and environmentally safe ingredients having no effect on plumbing materials which is one of adverse and corrosive. The plug material preferably includes at least one of: pharmaceutical grade proteins, starches, sugars, natural fibers, crystalline solids and minerals.

Where the lower end of a plumbing installation has several connections or openings into horizontal pipes below the installation, and each of these openings is closed by a barrier plug, and the plug material preferably includes different coloring pigments so that each plug gives its own distinctive color to the test water above it, and a worker observing the interior of a drain pipe to which the plumbing installation is connected can note the color of the draining test water from which it can be determined which plug has dislodged. The plug material optionally includes a fragrance releasing substance for releasing a fragrance into a plumbing installation for use where the plumbing installation is tested for leaks with injected air.

A method of assembling a tubular plumbing segment for sealingly securing between and in fluid communication with opposing and spaced apart portions of a plumbing installation, the tubular plumbing segment being formed of plumbing segment material and having a plumbing segment interior and a substantially smooth and continuous plumbing segment interior surface; and a barrier plug having a plug upper surface and a plug lower surface, and having a plug circumferential surface adhering to the plumbing segment interior surface and extending diametrically across and sealing the plumbing segment interior until dislodged by a plug dislodgement triggering means; including the steps of: providing a temporary support structure which is one of in and adjacent to the tubular plumbing segment; pouring a quantity of uncured plug material into the plumbing segment and onto to the support structure to a depth substantially matching the desired plug thickness; and permitting the plug material to cure; so that the curing of the plug material while in contact with the plumbing segment interior surface causes the plug material to adhere to the plumbing segment material.

A method of assembling a tubular plumbing segment for sealingly securing between and in fluid communication with opposing and spaced apart portions of a plumbing installation, the tubular plumbing segment having a plumbing segment inner diameter and being formed of plumbing segment material and having a plumbing segment interior and a substantially smooth and continuous plumbing segment interior surface; and a barrier plug having a plug upper surface and a plug lower surface, and having a plug circumferential surface adhering to the plumbing segment interior surface and extending diametrically across and sealing the plumbing segment interior until dislodged by a plug dislodgement triggering means; including the steps of: pre-forming the plug material into a cylinder of plug material to define a plug sized in diameter to closely fit the interior diameter of the tubular plumbing segment; applying an adhesive to the plumbing segment interior surface at a desired plug location; and sliding the plug into its desired position within the plumbing segment, and retaining the plug at the desired position until the adhesive cures, thereby bonding the plug to the plumbing segment.

A method of assembling a tubular plumbing segment for sealingly securing between and in fluid communication with opposing and spaced apart portions of a plumbing installation, the tubular plumbing segment being formed of plumbing segment material and having a plumbing segment interior and a substantially smooth and continuous plumbing segment interior surface; and a barrier plug having a plug upper surface and a plug lower surface, and having a plug circumferential surface adhering to the plumbing segment interior surface and extending diametrically across and sealing the plumbing segment interior until dislodged by a plug dislodgement triggering means; including the steps of: sizing the plug in diameter to fit into the plumbing segment; and then hydraulically pressing the plug to expand the plug diameter into gripping relation with the segment interior surface.

A method of assembling a tubular plumbing segment for sealingly securing between and in fluid communication with opposing and spaced apart portions of a plumbing installation, the tubular plumbing segment being formed of plumbing segment material and having a plumbing segment interior and a substantially smooth and continuous plumbing segment interior surface; and a barrier plug having a plug upper surface and a plug lower surface, and having a plug circumferential surface adhering to the plumbing segment interior surface and extending diametrically across and sealing the plumbing segment interior until dislodged by a plug dislodgement triggering means; including the step of: chemically actuating the plug to expand diametrically inside the plumbing segment into firm contact with the plumbing segment interior surface.

A method of assembling a tubular plumbing segment for sealingly securing between and in fluid communication with opposing and spaced apart portions of a plumbing installation, the tubular plumbing segment having a plumbing segment inner diameter and being formed of plumbing segment material and having a plumbing segment interior and a substantially smooth and continuous plumbing segment interior surface; and a barrier plug having a plug upper surface and a plug lower surface, and having a plug circumferential surface adhering to the plumbing segment interior surface and extending diametrically across and sealing the plumbing segment interior until dislodged by a plug dislodgement triggering means; including the steps of: providing a plug sized to be slightly greater in diameter than the plumbing segment inner diameter; and press fitting the plug into the plumbing segment.

BRIEF DESCRIPTION OF THE DRAWINGS

Various other objects, advantages, and features of the invention will become apparent to those skilled in the art from the following discussion taken in conjunction with the following drawings, in which.

DETAILED DESCRIPTION OF THE PREFERRED EMBODIMENTS

Figure 1:
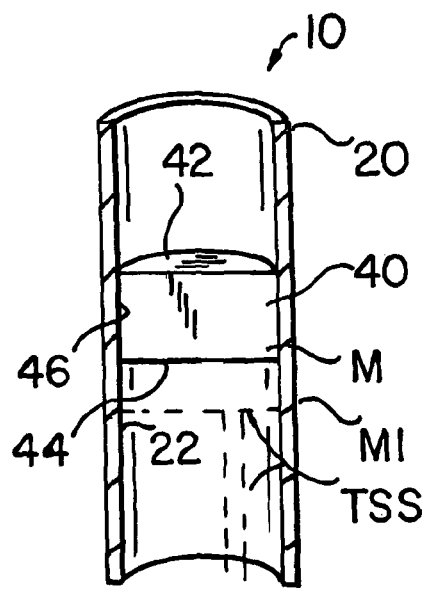
FIG. 1 is a perspective cross-sectional side view of a preferred version of the barrier plug assembly showing a temporary support structure in broken lines which is used to support the plug material until it cures within the tubular plumbing segment.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various FIGURES are designated by the same reference numerals.

First Preferred Embodiment

Figure 2:
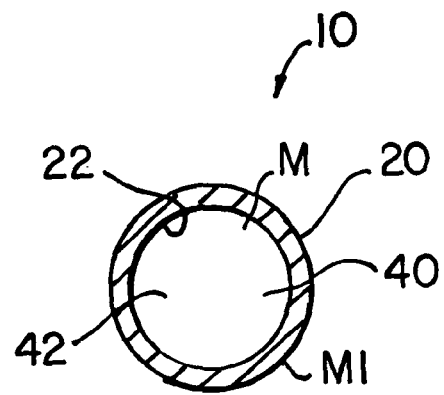
FIG. 2 is a top view of the barrier plug assembly of FIG. 1.
Figure 3:
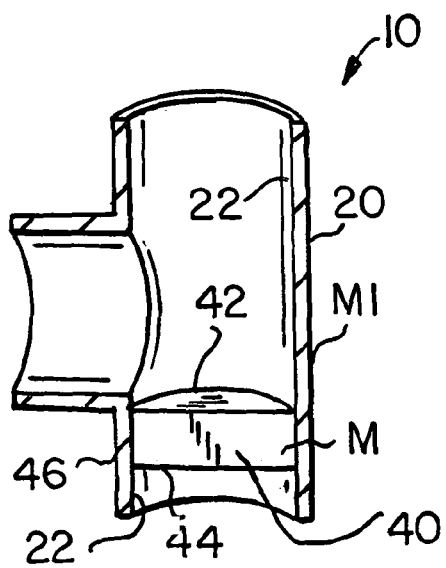
FIG. 3 is a perspective cross-sectional side view of another preferred version of the barrier plug assembly where the tubular plumbing segment is a plumbing T.
Figure 4:
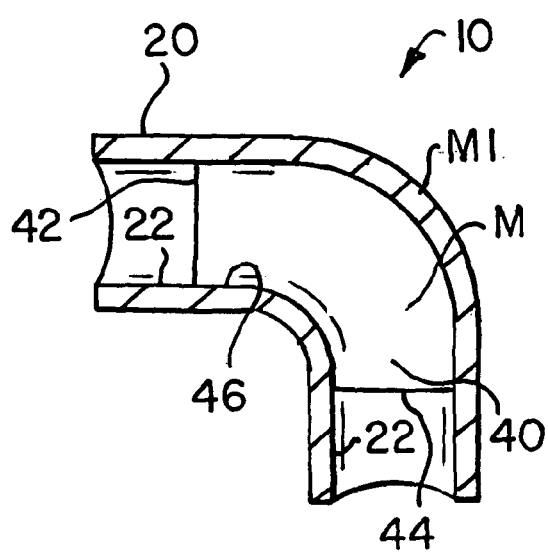
FIG. 4 is a perspective cross-sectional side view of yet another preferred version of the barrier plug assembly where the tubular plumbing segment is curved along its length.
Figure 5:
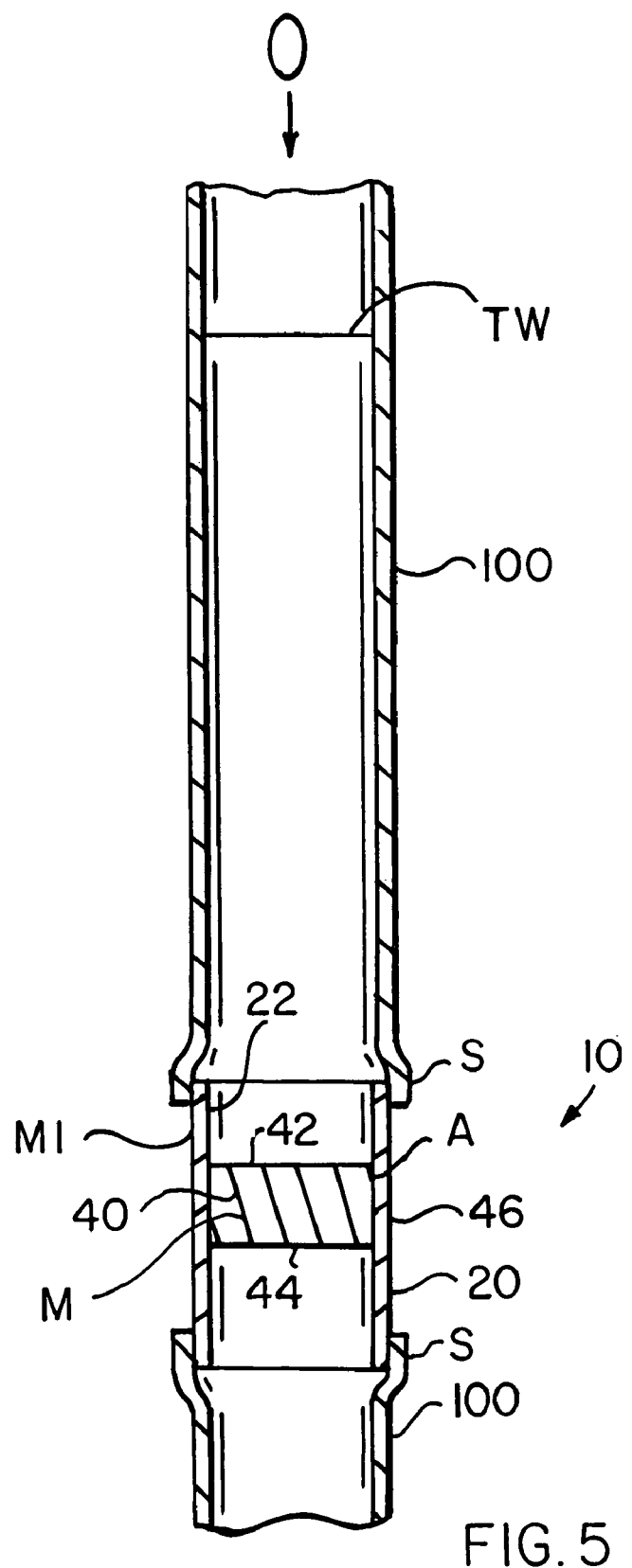
FIG. 5 is a cross-sectional side view of part of a plumbing installation fitted with the barrier plug assembly of FIG. 1, showing the optional use of an adhesive to retain the plug within the plumbing segment and the optional counteracting chemical to dissolve the barrier plug.

Referring to FIGS. 1-5, a barrier plug assembly 10 is disclosed for incorporation into a lower portion of a new plumbing installation 100 such as in a building under construction, for supporting a column of test water TW for inspection. The barrier plug assembly 10 includes a tubular plumbing segment 20 having a smooth and continuous plumbing segment interior surface 22 and a barrier plug 40 adhering to the interior surface 22 and extending diametrically across and sealing the plumbing segment 20 interior, the barrier plug 40 having a plug upper surface 42 and a plug lower surface 44, and having a plug circumferential surface 46 adhering to the plumbing segment interior surface 22 and being formed of dehydrated material M which absorbs water and weakens when a column of test water TW is introduced onto the plug upper surface 42. Once this weakening occurs, the plug 40 can no longer support the weight of the column of test water TW and therefore breaks and collapses so that the plumbing installation 100 is opened for operation. The resulting plug 40 fragments dissolve and drain out of the installation 100 with the test water TW. The tubular plumbing segment 20 preferably is either a standard pipe or fitting. Where the plumbing segment 20 and the pipes or fittings to which it is joined are formed of plastic such as polyvinyl chloride, the ends of the plumbing segment 20 are secured within opposing pipe sockets S to form a ledge-free contiguous interior surface between the pipes and the plumbing segment 20. Alternatively one or both ends of the plumbing segment 20 are fitted into fitting sockets S. Where the plumbing segment 20 and the pipes or fittings to which it is joined are formed of metal such as iron, a circumferential sealing clamp assembly such as a sealing ring and a hose clamp may be used to connect and seal the plumbing segment 20 and pipes or fittings together. The pipes or fittings in their approved manufactured state are ledge and recess free and in compliance with Code and manufacturer requirements, and must be installed butt pipe to pipe.

Plug Adhesion Means and Methods of Manufacture

The plug 40 is caused to adhere to the plumbing segment interior surface 22 by any suitable molecular engagement means. A first such means is molecular adhesion. A method of creating molecular adhesion with this means includes the steps of introducing a temporary support structure TSS into the tubular plumbing segment 20; then pouring a quantity of blended and uncured plug material M into the plumbing segment 20 and onto to the support structure TSS to a depth substantially matching the desired plug 40 thickness; and permitting the plug material M to cure. The temporary support structure TSS can be any flat impervious surface with or without a raised molded housing stem. The curing of the plug material M while in contact with the plumbing segment interior surface 22 causes the plug material M to adhere to the interior surface 22, so that no ledge, gap or other interior surface 22 irregularity is needed to support the plug 40. The chemical formulation of the plug material M causes this adhesion to take place upon curing, the chemical formulation formed of non-toxic, biodegradable and environmentally safe ingredients, and for example comprising: proteins, starches, sugars, natural fibers, crystalline solids and minerals. The formulation is selected to adhere to the particular plumbing segment 20 material, which preferably is polyvinyl chloride, but also could be cast iron, galvanized steel or any other suitable material.

A second such means is creating molecular adhesion with a bonding agent or adhesive A such as glue to secure the plug 40 to the plumbing segment interior surface. The adhesive is a composition that adheres to both the plug material M and the plumbing segment material M1 is biodegradable. The adhesive A preferably is a glue comprising natural collagen, sugars and casein configurations. A method of creating molecular adhesion with this means includes the steps of pre-forming the plug material M into a cylinder sized in diameter to closely or snugly fit the interior diameter of the tubular plumbing segment 20; preferably applying the adhesive to the plumbing segment interior surface 22 at the desired plug 40 location; then sliding the plug 40 into its desired position within the plumbing segment 20, and retaining the plug 40 at the desired position, either by temporary mechanical means or by simply positioning the tubular plumbing segment 20 on its side until the adhesive cures, thereby bonding the plug 40 to the plumbing segment 20.

A third such means is plug 40 expansion into snug high friction contact with the plumbing segment interior surface 22. Four preferred methods are provided of creating molecular adhesion with this expansion means. One method includes steps of sizing the plug 40 in diameter to loosely fit into the plumbing segment 20; and then hydraulically pressing the plug 40 to expand the plug 40 diameter into gripping relation with the segment interior surface S. Another method includes the steps of chemically actuating the plug 40 to expand diametrically inside the plumbing segment 20 into firm contact with the interior surface S.

A fourth means is press-fitting. The method of press fitting includes the steps of providing a plug 40 sized to be slightly greater in diameter than the plumbing segment 20 inner diameter; and press-fitting the plug 40 into plumbing segment 20.

Heat may be applied to certain types of plug material M and plumbing segment material M1 as an adhesion means itself, or may be applied as part of and in combination with any of the above adhesion means. In most instances, heat is most conveniently applied to the exterior of the tubular plumbing segment 20.

Plug Dislodgement Triggering Methods

The plug material M must support the column of test water TW for a sufficient length of time prior to collapse during which inspection can take place. This test water TW support duration is provided in any of several ways. A first way is to select and provide plug material M which dissolves at a rate such that for the given plug 40 thickness the plug 40 remains intact for a period of substantially 72 to 120 hours after application of test water TW to the plug 40. A second way is to design the plug 40 to have a maximum strength exceeding the force of the weight of the intended column of test water TW by a specific amount. As a result, plug 40 is collapsed at a selected moment by taking the active step of adding water to the column of test water TW until the pressure reaches a designed plug 40 failure point and the plug 40 collapses. A third way is to form the plug 40 of a plug material M having a chemical composition which is weakened or dissolved by the presence of a counteracting chemical CC, and to provide a quantity of the counteracting chemical CC, preferably in either liquid or tablet form, and introducing the counteracting chemical CC into the column of test water TW after inspection of the installation 100 is complete. The counteracting chemical CC causes the plug 40 to promptly weaken such as by dissolving, and then to dislodge such as through fragmentation and collapse.

Just as the application of heat can cause the plug material M to bond or to fuse with the plumbing segment material M1, the application of heat to the exterior of the plumbing segment 20 can cause dislodgement of the plug 40 depending on the selection of plug material M and plumbing segment material M1.

Plug 40 coloring pigments as well as fragrances are optionally added to the plug material M during plug 40 formation. Normally the lower end of a plumbing installation 100 has several connections or openings into horizontal pipes below the installation 100, and each of these openings is closed by a barrier plug 40. These plugs 40 preferably contain different coloring pigments so that each plug has its own distinctive color, and releases the pigment and thus the distinctive color into the test water TW above it. A worker is assigned the task of observing the interior of a horizontal pipe through which test water TW will drain. Then, if the inspector does not arrive until the end of the plug 40 life following application of test water TW, and one or more of the plugs 40 fails before his inspection is completed, the worker observing test water TW drainage through the horizontal pipes notes the color of the draining test water TW from which it can be determined which plug or plugs 40 have collapsed. As a separate matter, the colored test water TW might also make it easier to spot any leaks in the plumbing installation 100. Fragrance producing material is optionally added to the plug 40 to enter the test water TW or to permeate air within the plumbing installation 100 during an air test above the given plug 40 to help with locating any leaks in the installation 100. It is alternatively contemplated that the coloring pigment or fragrance be added directly to the test water TW, rather than being released from the plug 40.

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A method of assembling a tubular plumbing segment for sealingly securing between and in fluid communication with opposing and spaced apart portions of a plumbing installation, comprising the steps of:

providing a tubular plumbing segment formed of plumbing segment material and having a plumbing segment interior and a substantially smooth and continuous plumbing segment interior surface;

providing a barrier plug having a plug upper surface and a plug lower surface, and having a plug circumferential surface for adhering to the plumbing segment interior surface and sized in plug diameter to fit into the plumbing segment;

introducing a column of water onto the plug upper surface for a sufficient duration that the plug can no longer support the weight of the column of test water and therefore dislodges such that the plumbing installation is opened for operation;

and then hydraulically compressing the plug to plasticly deform the plug such that the plug upper surface and the plug lower surface are brought closer to each other and the plug diameter is thereby expanded into gripping and sealing relation with the segment interior surface until dislodged by a plug dislodgement triggering means.

2. A method of assembling a tubular plumbing segment for sealingly securing between and in fluid communication with opposing and spaced apart portions of a plumbing installation; comprising the steps of:

providing a tubular plumbing segment formed of plumbing segment material and having a plumbing segment interior and a substantially smooth and continuous plumbing segment interior surface;

providing a barrier plug having a plug upper surface and a plug lower surface, and having a plug circumferential surface for adhering to the plumbing segment interior surface and sized in plug diameter to fit into the plumbing segment and formed of a material which weakens when a dissolving substance is introduced onto the plug upper surface;

introducing a column of water comprising the dissolving substance onto the plug upper surface for a sufficient duration that the plug can no longer support the weight of the column of test water and therefore dislodges such that the plumbing installation is opened for operation;

and then hydraulically compressing the plug to plasticly deform the plug such that the plug upper surface and the plug lower surface are brought closer to each other and the plug diameter is thereby expanded into gripping and sealing relation with the segment interior surface until dislodged by a plug dislodgement triggering means.

3. The method of claim 2, wherein the dissolving substance is one of water and a counteracting chemical.

* * * * *